United States Patent
Stoyle et al.

(10) Patent No.: US 6,341,179 B1
(45) Date of Patent: Jan. 22, 2002

(54) METHOD AND APPARATUS FOR IMAGING ARTEFACT REDUCTION

(75) Inventors: Peter N R Stoyle, Malvern; Derek L G Hill; David Atkinson, both of London, all of (GB)

(73) Assignee: The Secretary of State for Defence in Her Brittanic Majesty's Government of the United Kingdom of Great Britain and Northern Ireland, Farnborough (GB)

( * ) Notice: Subject to any disclaimer, the term of this patent is extended or adjusted under 35 U.S.C. 154(b) by 0 days.

(21) Appl. No.: 09/180,751
(22) PCT Filed: Jul. 3, 1997
(86) PCT No.: PCT/GB97/01791
§ 371 Date: Nov. 17, 1998
§ 102(e) Date: Nov. 17, 1998
(87) PCT Pub. No.: WO98/01828
PCT Pub. Date: Jan. 15, 1998

(30) Foreign Application Priority Data

Jul. 9, 1996 (GB) .............................................. 9614407

(51) Int. Cl.[7] .............................................. G06T 11/00
(52) U.S. Cl. ...................................... 382/254; 382/255
(58) Field of Search .................................. 382/254–255; 396/76–82, 104

(56) References Cited

U.S. PATENT DOCUMENTS

| 5,251,128 A | 10/1993 | Crawford ............... 364/413.19 |
| 5,311,132 A | 5/1994 | Noll et al. ................... 324/309 |
| 5,387,930 A | 2/1995 | Toh ............................ 348/207 |

FOREIGN PATENT DOCUMENTS

| EP | 0 370 341 | 5/1990 |
| JP | 05 080248 | 4/1993 |
| WO | 98/01828 | * 1/1998 |

OTHER PUBLICATIONS

Ritchie C J et al: "Correction of Computed Tomography Motion Artifacts Using Pixel–Specific Back–Projection", IEEE Transactions On Medical Imaging, vol. 15, No. 3, pp. 333–342.

* cited by examiner

Primary Examiner—Thomas D. Lee
Assistant Examiner—Stephen Brinich
(74) Attorney, Agent, or Firm—Nixon & Vanderhye P.C.

(57) ABSTRACT

The invention relates to a method and apparatus for reducing imaging artifacts in physiological images, such as magnetic resonance imaging images. A model of a physical cause for the image artifact is modelled and the effects of perturbing this model on a focus criterion of the image analyzed so as to optimize the focus criterion. For an optimized focus criterion, the model should reflect the actual physical cause of the image artifact. A focus criterion is a measure of entropy of the image, with an optimized image having reduced entropy.

24 Claims, 10 Drawing Sheets

Fig.8.

1. set stepSize = 1 mm
2. evaluate the modified entropy focus criterion on the initial defocussed image $J^p$, denote this $F_{current} = F(J^p)$
3. initialise to zero the current patient Motion Estimate $m(i) = 0$ $i = (1,2,...,N)$
4. do while stepSize ≥ 0.5 mm
5.     set nodeSweep = 0
6.     set $F_{lastSweep} = F_{current}$
7.     do 100 Node = 1 to N     {commence sweep through nodes}
8.         set Node = π(Node)   {node order is centric, out from midNode}
9.         if Node = midNode (i.e. the DC node), goto 100
10.        do 200 step = -3*stepSize, 3*setSize, stepSize    {node perturbation}
11.            if (step=0) goto 200    {skip to loop end for zero perturbation}
12.            set $m'(i) = m(i)$, $i \neq$ Node
13.            set $m'(Node) = m(Node) + step$
14.            evaluate $F(J_{m'})$ where vector $m' = (m'(1), m'(2), ..m'(Node))$
15.            if $F(J_{m'}) < F_{current}$ then
16.                set $F_{current} = F(J_{m'})$
17.                set vector $m = m'$
18.            end if
19.        200: end do            {end 'do step' loop}
20.     100: end do            {end of 'do Node' loop}
21.     if $(F_{lastSweep} - F_{current}) < \varepsilon$, set stepSize = stepSize/2
22. end do            {end of 'do while stepSize' loop}

Fig.9.

1.        do 200 step = -3*stepSize, 3*setSize, stepSize
2.            do 300 $k = 1, 3$
3.               set $m'_k(i) = m_k(i)$
4. ............................ as before with $m$ and $m'$ now subscripted by $k$
5. ............................
6.            300: end do            {end of 'do $k = 1, 3$ loop}
7.        200: end do            {end of 'do step' loop}

METHOD AND APPARATUS FOR IMAGING ARTEFACT REDUCTION

BACKGROUND OF THE INVENTION

1. Field of the Invention

The present invention relates to image processing and in particular to image processing techniques whereby image artefacts produced during image acquisition are corrected for in the generation of an output image.

2. Discussion of Prior Art

Magnetic Resonance Imaging (MRI) is a widely used technique for medical diagnostic imaging. In a conventional MRI scanner, a patient is placed in an intense static magnetic field which results in the alignment of the magnetic moments of nuclei with non-zero spin quantum numbers either parallel or anti-parallel to the field direction. Boltzmann distribution of moments between the two orientations results in a net magnetisation along the field direction. This magnetisation may be manipulated by applying a radiofrequency (RF) magnetic field at a frequency determined by the nuclear species under study and the strength of the applied field. In almost all cases, the species studied is the nucleus of the hydrogen atom, present in the body mainly in water molecules, and RF pulses are applied at the resonant frequency of these water protons.

The energy absorbed by nuclei from the RF field is subsequently re-emitted and may be detected as an oscillating electrical voltage, or free induction decay (FID) signal in an appropriately tuned antenna. More commonly, a further RF pulse, or magnetic field gradient, is used to postpone signal acquisition and generate a spin-echo or gradient-echo signal.

Spatial information is encoded into the echo signal by virtue of additional linearly varying magnetic fields, known as magnetic field gradients, applied during or prior to echo acquisition. The principle of spatial encoding is that in the presence of the field gradient, the net field experienced by a given nuclear moment, and hence its resonant frequency, is a function of position within the scanner. When a gradient is applied during the echo acquisition, the received signal contains a range of frequency components representing nuclei at different locations along the gradient direction. Fourier transformation of this signal yields a one-dimensional projection through the patient. This technique is known as frequency encoding. Two-dimensional encoding requires use of an additional gradient applied perpendicular to the frequency encoding axis, known as the phase encoding gradient. This gradient is applied for a short time prior to data acquisition. The acquisition process is repeated perhaps 256 or 512 times using phase encoding gradients of different strengths. Simultaneous frequency and phase encoding yields a two-dimensional data set which when subjected to two-dimensional Fourier transformation provides the required image. This array of data exists in what is known as k-space and is the Fourier transform of the image space. The effect of the phase encoding gradient is to move the start of the data acquisition to a particular location along one axis in k-space (dependent on the gradient strength), whilst frequency encoding represents a sweep through k-space parallel to the other axis. Each of these sweeps is known as a "shot" or "view".

Spatial localisation in the third dimension may be achieved using an additional phase encoding gradient, or more commonly by using a gradient and narrowband RF pulse to restrict the initial perturbation of nuclear moments to a single tomographic slice. This principle can readily be extended to multislice MRI.

In conventional MRI, a single phase-encoding view is acquired after each RF excitation. However, faster imaging sequences now exist in which further RF pulses and phase encoding gradients are used to acquire a train of differently encoded echoes after each excitation. These echoes traverse several lines of k-space and reduce scanning time by a factor equal to the echo train length. In the extreme case, single shot echo planar imaging (EPI) techniques cover the whole of two dimensional k-space in a single acquisition lasting less than 100 ms, although spatial resolution and image quality may be significantly compromised.

Patient movement during the acquisition of MRI images results in degradation of the images that can obscure the clinically relevant information. Each readout period takes a few milliseconds (ms), whereas the time interval between readouts might be between 500 and 2000 ms. The majority of blurring and ghosting artefacts caused by patient motion are due to motion between lines in k-space, rather than motion during a single readout.

Movement leads to phase errors between lines of k-space, which in the resulting image appear as blurring and ghosting along the phase encode direction. These phase errors can result from translations and rotations. Translations of the patient in the readout direction result in a frequency dependent phase shift in each line of k-space. Rotations in the spatial domain are also rotations in k-space, and result in a phase shift that is a more complicated function of position.

A particular type of MRI image investigation, known as diffusion weighted imaging, takes place in the presence of an additional and separate gradient. The integral over time of the diffusion weighted gradient is greater than the integral for the phase encode or readout gradients. The purpose of this additional gradient is to make the images sensitive to molecular motion of the order of 10 $\mu$m. A side effect is that the images are also sensitive to bulk motion on the same scale. Anderson et al. in Magn. Reson. Med. Volume 32, 1994, pages 379–387 have shown that for small rigid body movements, the resulting artefacts can be modelled using zero and first order phase correction terms.

Considerable work has been done by MR researchers to model patient motion, and to attempt to correct for it. The impact of different types of motion on the resulting images is well understood, but clinically usable retrospective motion correction techniques are not yet available. Existing algorithms tend to correct only for one dimensional motion, or they require exotic image acquisition strategies that are not generally applicable.

There are broadly two classes of movement correction algorithm used in MRI; with and without "navigator echoes". Motion correction using additional echoes referred to as "navigator echoes" involves the acquisition of additional echoes that are not phase encoded between each phase encoded echo. All navigator echoes are projections through the object. It is therefore possible to measure motion between the navigator echoes, and consequently infer the motion between the corresponding phase encoded echoes. The navigator echoes are most commonly used to measure motion in one or more translational directions. Published papers describing the use of navigator echo techniques include that of Ehman et al. in Radiology, Volume 173, 1989, pages 255 to 263. Recently several authors have proposed obtaining rotational information either from these straightforward navigator echoes, for example Anderson et al. in Magn. Reson. Med. Volume 32, 1994, pages 379–387, or from circular navigator echoes for example Fu et al. in Proc. Soc. Magn. Reson., 1994, page 355.

There have been attempts to measure movement directly from the phase encoded data. Felmlee et al., as reported in Radiology, Volume 179, 1991, pages 139 to 142 tried to measure translations directly from a hybrid space comprising the Fourier transform of the readout vs. phase encode, but found that it worked for phantoms with high spatial frequency edges, but on human subjects only if high contrast markers were used. A possible solution to this is to acquire spiral readouts, all of which sample a range of spatial frequencies as described by Khadem et al. in Proc. Soc. Magn. Reson., 1994, page 346, but this is impractical on the majority of MRI hardware. An alternative strategy described by Wood et al. in J. Magn. Reson. Imag., Volume 5, 1995, pages 57 to 64, is to locate discontinuities in k-space that correspond to sudden movements of the patient, to split the regions of k-space between these discontinuities into sub-images, then to correct for translations by applying a phase shift to k-space, and rotations by rotating in the spatial domain. This technique cannot correct for continuous movement during acquisition, and would appear to require considerable user interaction.

An alternative approach to motion correction without navigator echoes is the Projection Onto Complex Sets (POCS) technique described by Hedley et al. in IEEE Trans. Med. Imag., Volume 10, 1991, pages 548 to 553 and extended by Gmitro et al. in "Information Processing in Medical Imaging, ed. Bizais, Barillot, Paola, Iles de Berder, Kluwer, 1995. This has been proposed as a means of correcting for motion during diffusion weighted imaging of the brain.

In the implementation used by Gmitro, the constraint in the image domain is provided by an image acquired without any diffusion weighting gradient (the reference image). Correction is performed in hybrid space (x vs. $K_y$), under the constraint that the magnitude and higher-order phase terms of each line are correct.

A binary mask is generated from this reference image (spatial domain), in which pixels inside the head are given the value 1, and pixels outside the head the value 0. This constraint is applied to the corrupted images by multiplying the image by the mask function. The resulting product image has a black background, and consequently lacks the ghosting artefacts outside the head that are caused by motion. This masked image is then transformed into hybrid space, and is compared, line by line, with the hybrid space of the original (unmasked) image. The zero and first order phase terms that, when applied to the original hybrid space lines, produce the closest match (in a root mean square sense) to the lines of the hybrid space from the masked image are then found using a search procedure. These phase terms are then treated as estimates of the motion correction parameters, and the algorithm reiterates.

In general, a mask image as required by this algorithm, may not be available, or may be out of registration with the images that need correction, and thus inaccurate.

The use of averaging or correlation to smooth out motion artefacts has been described in U.S. Pat. Nos. 5,363,044, 5,233,302, 5,124,649, and 4,966,149. The correction of image data using motion information derived from the image data or from extra motion detection or position tracking sequences is described in U.S. Pat. Nos. 5,427,101, 5,382,902, 5,254,948 and 5,251,128 and in Japanese Pat No 05080248. U.S. Pat. No. 5,311,132 describes correcting demodulation frequency in an MRI imaging process using a focusing criterion to determine image blur.

The technique described in U.S. Pat. No. 5,363,044 requires the acquisition of two interleaved data sets. These data sets are combined into a single image. The image is divided into sub-sections and a "gradient energy" term is summed over all the pixels of each sub-section of this image. The gradient energy term is defined as the sum over all the pixels of the total of the squares of four partial derivatives of the real and imaginary parts of a complex image, with the partial derivatives being the difference between an image and the image shifted by one pixel. A phase term used in the data combination is varied until the gradient energy sum in each sub-section is minimised. This technique determines a phase factor which locally removes ghosts in an image. The phase factor depends on the interleave conditions and the harmonic number of the motion. It assumes that the motion is periodic or quasi-periodic with respect to the acquisition order. It is likely that to be effective, this technique requires the image to be sub-divided into regions. where the ghosts do not overlap either each other or the main body of the image and therefore its applicability is limited.

U.S. Pat. No. 5,311,132 describes a technique for correcting magnetic resonance images by removing blur introduced as a result of magnetic field inhomogeneities and variations in magnetic susceptibility of an object being imaged. It does not correct for artefacts due to motion. The technique described therein involves demodulating acquired data at different frequencies to overcome such blurring. Using a local focus criterion, the demodulation frequencies which optimise the focus of each region of an image are determined. Compensating for magnetic field inhomogeneities is significantly less complex than correcting for motion artefacts. Only one parameter needs to be searched for at each image region. Correction for motion artefacts is more complex because motion affects the focus in all regions and in general there are six degrees of freedom rather than one for field inhomogeneities. The technique is applicable only to non-Fourier transform reconstruction techniques.

SUMMARY OF THE INVENTION

It is an aim of the present invention to provide an alternative method for processing signals generated by a magnetic resonance imaging machine to generate an image such that image defects arising from patient motion during the acquisition of the signals are corrected for in a manner which does not require a modified signal acquisition technique.

The present invention provides a method for generating an artefact reduced physiological image of an object comprising the steps of:

(i) acquiring a data set from a plurality of received signals generated in an object measuring process;

(ii) manipulating the data set in order to generate an image therefrom, wherein the data set manipulation includes the reduction of image artefacts resulting from object motion during said object measuring process, characterised in that the data set manipulation step includes the stages of:

(a) calculating a focus criterion for an initial artefact containing image;

(b) generating an initial model for the motion of the object during the object measuring process;

(c) manipulating the data set in order to compensate for the effects of the model and recalculating the focus criterion for the manipulated data set; and (d) iteratively varying the model and repeating stage (c) in order to obtain a final object motion model with which the focus criterion is optimised;

wherein the artefact reduced image is then generated from the data set after the data set has been manipulated in order to offset the effects of the final object motion model.

The invention provides the benefit of providing a method whereby the image quality of certain images which are distorted by motion of the object during data acquisition may be improved.

The method of the invention is particularly applicable for manipulating images obtained using magnetic resonance imaging (MRI) techniques. Preferably the focus criterion is an image entropy criterion. The term image entropy is taken here to mean the degree of disorder in an image.

Patient motion in MRI scans may be in directions known as the readout direction and the phase encode direction. The data set may be manipulated to reduce the effect of patient motion in these directions. In addition, rotation motions may be corrected.

An image entropy criterion may be taken over the whole of an image or it may be determined for specific regions of an image. For example in an MRI image of a head, the image entropy may be calculated for only for those regions of the whole image in which the patients head is imaged.

Several techniques for varying the model of patient motion may be used. The patient motion model may be varied in a piecewise linear or piecewise constant manner. In more sophisticated techniques segments of the patient motion curve are varied with the size of the segments being reduced as the model is optimised. Alternatively a limited set of nodes of the patient motion curve may be initially varied with more nodes then being varied to obtain a finer scale patient motion curve. It may be desired to initially obtain an image over a limited sub-set of k-space lines, with the focus criterion for this sub-image being optimised before the sub-set is expanded. These techniques might be employed to reduce the time taken to obtain a corrected image.

In a further aspect, the invention provides a method of improving the image quality of magnetic resonance imaging images by the reduction of motion induced artefacts comprising the steps of:
 (a) calculating a focus criterion for an initial artefact containing image;
 (b) generating a model of a possible motion sequence as a cause of the artefact;
 (c) manipulating the data set in order to compensate for the effects of the model and recalculating the focus criterion for the manipulated data set; and
 (d) iteratively varying the model in order to obtain a final model with which the focus criterion is optimised;
 wherein the artefact reduced image is then generated from the data set after the data set has been manipulated in order to offset the effects of the final model.

Compared with prior art techniques for MRI image improvement where a specialised image acquisition strategy has to be adopted, this aspect of the invention provides the advantage that a conventional imaging process may be used which is then followed by a post-acquisition processing stage.

In another aspect, the invention provides a magnetic resonance imaging scanner arranged to generate an artefact reduced image of a patient by performing the steps of:
 (i) acquiring a data set from a plurality of received signals generated in a patient measuring process;
 (ii) manipulating the data set in order to generate an image therefrom, wherein the data set manipulation includes the reduction of image artefacts resulting from patient motion during data acquisition,
characterised in that the data set manipulation step includes the stages of:
 (a) calculating a focus criterion for an initial motion artefact containing image;
 (b) generating a patient motion model as a possible cause of the artefact;
 (c) manipulating the data set in order to compensate for the effects of the model and recalculating the focus criterion for the manipulated data set; and
 (d) iteratively varying the model in order to obtain a final model with which the focus criterion is optimised;
 wherein the artefact reduced image is then generated from the data set after the data set has been manipulated in order to offset the effects of the final model.

Subsequent to the filing of the priority application, a scientific paper by R. A. Zoroofi, Y. Sato, S. Tamura and H. Naito was published in IEEE Transactions on Medical Imaging, Vol. 15, No. 6, December 1996, pages 768–784, relating to MRI artefact cancellation due to rigid motion in the imaging plane. The paper concerns blurring and ghosting due to motion during the image acquisition. The technique described therein involves using a minimum energy method to estimate unknown motion parameters. The minimum energy method requires a knowledge of the boundary of a region of interest whereas an entropy focus criterion does not require knowledge of any boundary position. The method of Zoroofi et al. is to select a group of k-space lines over which they believe there has been no motion, based on tests which are performed algorithmically, and an image is formed from these lines, thresholded and used as the boundary of the region of interest. In order for the method to be effective it is necessary to be able to identify a group of k-space lines over which there is little motion. The method of the present invention does not have this requirement and can compensate for continuous motion.

BRIEF DESCRIPTION OF THE DRAWINGS

In order that the invention may be more fully understood, examples thereof will now be described, by way of example only, with reference to the accompanying drawings in which:

FIGS. 8 and 9 are pseudo-code algorithms; and

DETAILED DISCUSSION OF PREFERRED EMBODIMENTS

Figure 1:
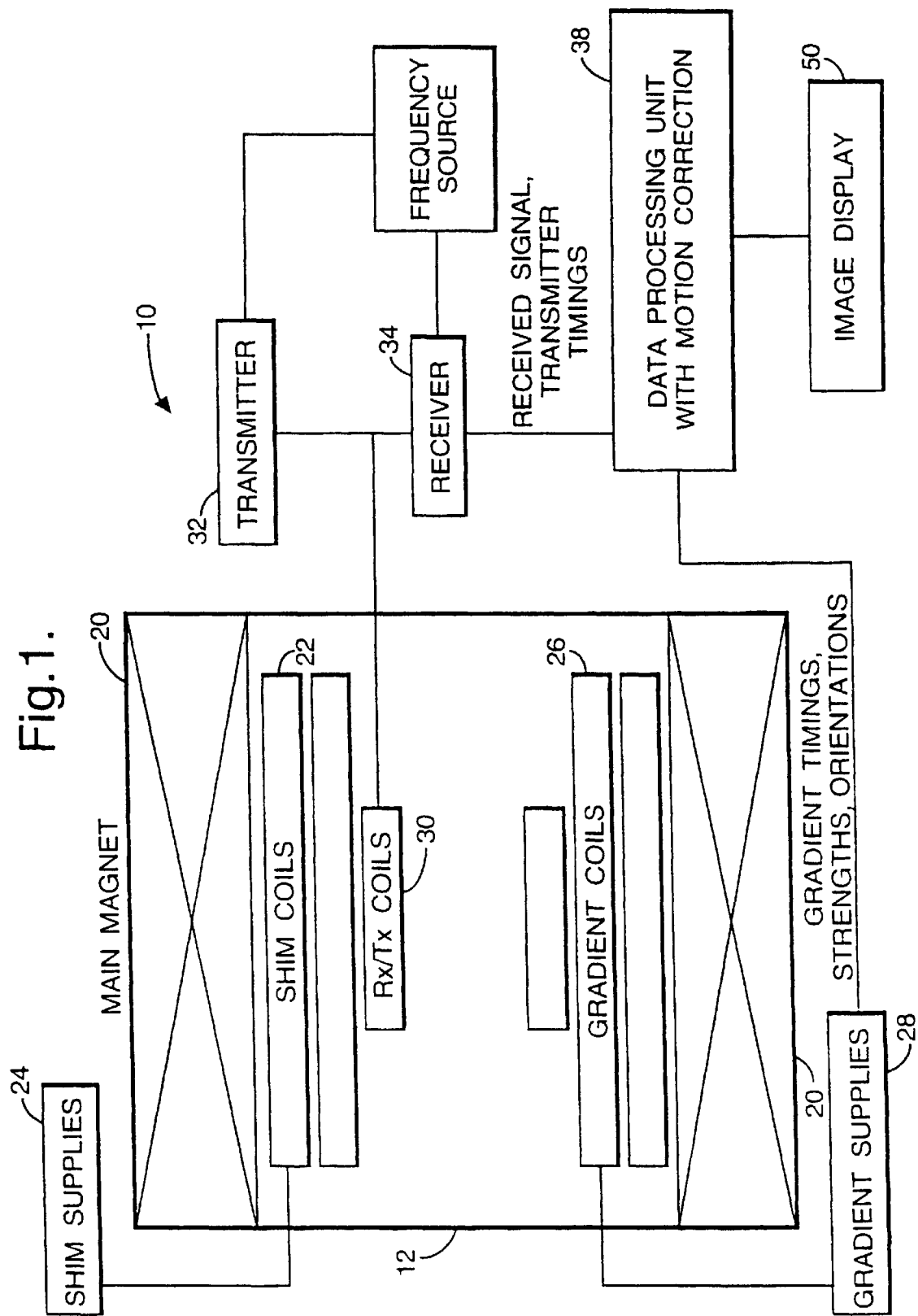
FIG. 1 shows a schematic diagram of a magnetic resonance imaging system.

Referring to FIG. 1 there is shown a schematic diagram of a magnetic resonance imaging system 10. The system 10 incorporates a magnetic resonance imaging scanner 12 of conventional type. The scanner 12 has a superconducting main magnet 20 which generates a magnetic field sufficiently strong to cause a net alignment along the field direction of atomic nuclei within a patient. The scanner 12 also includes shim coils 22 in order to correct for undesired inhomogeneities in the magnetic field of the main magnet 20. The magnetic field produced by the shim coils 22 is controlled by a shim coil power supply unit 24.

The resonance frequency of particular atomic nuclei is characteristic of the nucleus and the strength of the applied magnetic field. In order to provide spatial information, a magnetic field gradient is generated by gradient coils such as coils 26. Gradient coils are often arranged to generate gradient fields in three orthogonal directions. The magnetic fields generated by the gradient coils are controlled by a gradient coil power supply unit 28. In order to generate a signal from the atomic nuclei of the patient, a radio-frequency magnetic pulse is generated by a transmit coil 30. This pulse "flips" the angle of the nuclear spins within a certain patient slice of volume. These "excited" spins, or magnetisations, then induce a current in a receive coil which may be the same coil as the transmit coil 30. The coil 30 is connected to a transmit unit 32 and a receive unit 34, each of which also receives signals from a frequency source 36.

The system 10 includes a controlling computer 38 which controls the operation of the components of the system 10. The computer 38 controls the gradient coil power supply unit 28 in the form of gradient timing, magnetic field strength and orientation control. In addition, the computer receives signals from the receive unit 34 together with transmitter timings.

In order to form an image of the organs of a patient, the patient is inserted into the system 10 and a series of measurements are taken with different combinations of static and/or varying gradient fields. The signals from the tissue of the patient depend on the tissue's properties, the magnetic field gradient strengths, gradient orientations and timings with respect to the applied radio frequency pulses. The varying gradients code the received signal's phase, frequency and intensity. The received signals as a function of time form an ordered set which is stored in memory in the computer 38 for subsequent processing.

In the subsequent signal processing stage, a Fourier transform is performed on the ordered set of received signals, with the modulus of the transform being used to assign the signals to a grey scale in order to form an image. The set of received signals is often referred to as existing in "k-space".

In conventional MRI, if the patient moves during the acquisition of data, the received signal is affected and part of the k-space signal is corrupted. Because of the way the image is reconstructed, this motion affects the whole image, causing blurring and/or ghosting artefacts in the final image.

Figure 2:
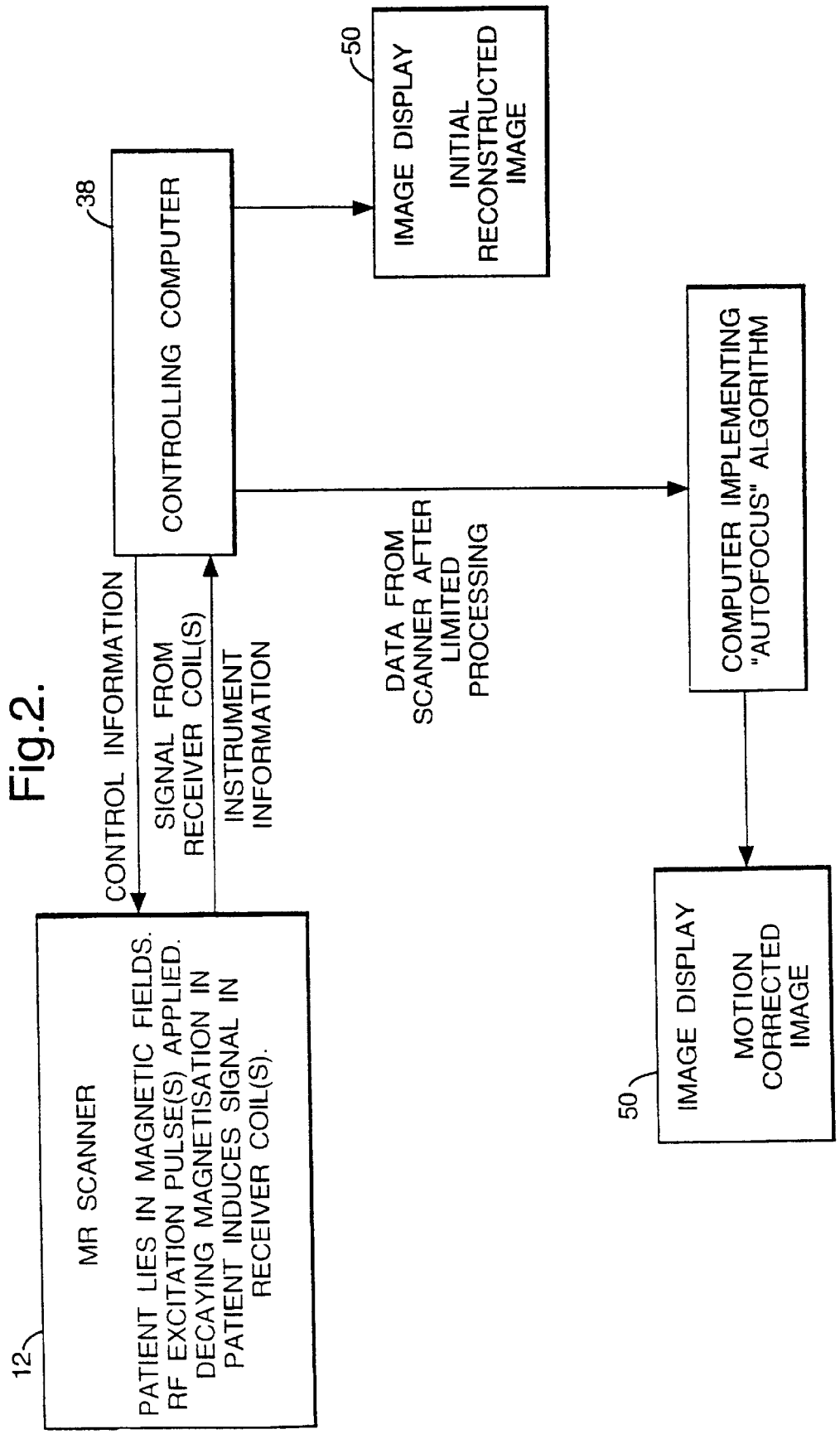
FIG. 2 is a functional diagram of the operation of the FIG. 1 system.

Referring now to FIG. 2 there is shown a functional block diagram of the operation of the system 10. The computer 38 controls and receives information from the scanner 12 and uses this information to generate an image on a display 50. This image is an initial reconstructed image. If an operator of the system 10 considers that the initial image is corrupted due to patient motion, a further signal processing routine is selected. Data which is stored in the computer 38 is then further processed in order to reduce the effects of the patient's movement. The following is a description of the principles behind this further signal processing routine.

The magnet, or gradient frame is denoted by capital letters, the body frame by lower case. Consider a point P in the gradient frame. Its position in the body frame, is $\vec{r}_0$ before movement and $\vec{r}$ after movement. In the gradient frame, the position of P remains at $\vec{R}$, irrespective of the body's motion. At some pre-defined time, for example at the middle of the acquisition, when $k_y=0$, the body and gradient frame origins are taken to coincide and $\vec{r}_0=\vec{R}$. The patient motion with respect to this time and the gradient frame is described by a vector $\vec{M}$. Before and after motion, the magnetisations in the gradient frame $\rho_G$ are related to the body frame magnetisations $\rho_b$ (the desired image) by:

$$\rho_G(\vec{R}) = \rho_b(\vec{r}_0 = \vec{R}) \quad \text{(before motion)}$$
$$= \rho_b(\vec{R} - \vec{M}) \quad \text{(after motion)}$$
$$= \rho_b(\vec{r}).$$

The signal S (ignoring constants, relaxation etc.) is measured in the gradient frame $$S(\vec{K}) = \int \rho_G(\vec{R}) \exp[i\vec{K}.\vec{R}] d\vec{R}$$

where K is the k-space co-ordinate in the gradient frame. So after motion $$S(K) = \int \rho_b(\vec{R}-\vec{M}) \exp[i\vec{K}.\vec{R}] d\vec{R}$$

ie $$S(K) = \int \rho_b(\vec{R}-\vec{M}) \exp[i\vec{K}.(\vec{R}-\vec{M})] \exp[i\vec{K}.\vec{M}] d\vec{R}$$

It is possible to swap $d\vec{R}$ for $d\vec{r}$ because $\vec{r}=\vec{R}-\vec{M}$ and does not depend on $\vec{R}$ (for a rigid body, all parts of the body move together independent of position in the gradient frame). Hence $$S(\vec{K}) = \int \rho_b(\vec{r}) \exp[i\vec{K}.(\vec{r})] \exp[i\vec{K}.\vec{M}] d\vec{r}.$$

The motion vector $\vec{M}$ is composed of a translation $\vec{M}_T$ and a rotation $\vec{M}_R$. Any rigid-body motion can be described as a translation followed by a rotation. Here the rotation axis is taken to be through the origin of the body frame and rotation is described by the small angle approximation $\vec{M}_R = \vec{\theta} \times \vec{r}$.

$$\vec{M}_R = \vec{\theta} \times \vec{r} = det \begin{vmatrix} \vec{i} & \vec{j} & \vec{k} \\ 0 & 0 & \theta_z \\ r_x & r_y & r_z \end{vmatrix} = \vec{i}(-\theta_z r_y) + \vec{j}(\theta_z r_x)$$

for $\theta_x=\theta_y=0$. This cross product is the change in co-ordinates not the new one.

The translation may be brought out of the integration as it has no $\vec{r}$ dependence (and in the absence of rotation we have the Fourier shift theorem).

$$S(\vec{K}) = \exp[i\vec{K}.\vec{M}_T] \int \rho_b(\vec{r}) \exp[(i\vec{K}.\vec{r})] \exp[i\vec{K}.\vec{M}_R] d\vec{r} =$$
$$\exp[i\vec{K}.\vec{M}_T] \int \rho_b(\vec{r}) \exp[i\vec{K}.\vec{r}] \exp[i\vec{K}.(\vec{\theta} \times \vec{r})] d\vec{r}$$

Cyclic permutation of the scalar triple product gives $\vec{r} \cdot (\vec{K} \times \vec{\theta})$ and hence $$S(\vec{K}) = exp[i\vec{K} \cdot \vec{M}_T] \int \rho_b(\vec{r}) exp[i\vec{r} \cdot (\vec{K} + d\vec{K})] d\vec{r}$$

With rotation only about the z axis, $d\vec{K} = \vec{i}(\vec{K}_y \vec{\theta}_z) - \vec{j}(K_x \theta_z)$.

This is the Fourier rotation theorem with a small angle approximation. For image correction, translations can be corrected by applying the phase-shift factor $exp[-i\vec{K} \cdot \vec{M}_T]$ to the measured signal. To compensate for rotation, either k-space or the image should be rotated. For diffusion weighted images, the effect of rotation is to produce a $d\vec{K}$ that depends only on the diffusion gradients, not the imaging gradients represented by $K_x$ and $K_y$. This makes the compensation problem easier as rotation causes a constant shift of k-space and can be corrected by a phase-shift in the image domain.

During the measurement process, $N_y$ readout lines are obtained. If there is patient motion during the measurement process then there is a resulting displacement of the patient at each readout time. The $N_y$ readout lines are indexed by the superscript j where $j=0,1,2 \ldots, N_y-1$. Considering translational motion only, a displacement vector $\vec{M}_T^j$ at each time is composed of a displacement $m_x^j$ in the frequency encoding direction (x) and displacement $m_y^j$ in the phase encoding direction (y) such that $\vec{M}_T = \vec{i} m_x + \vec{j} m_y$, dropping the superscripts for clarity. As given above, image compensation is performed by multiplying the k-space data by the phase shift factor $exp[-i\vec{K} \cdot \vec{M}_T^j]$. The compensation for translation is a linear process, as is the Fourier transform between image and k-space. Consequently, correction for two dimensional translations can be separated into one dimensional readout and phase encode compensations.

For one dimensional readout compensations the phase term used to correct each point u in the readout line (in k-space) is $exp[-iK_x \cdot m_x^j]$ where $$K_x = \frac{2\pi}{FOV_x}\left(u - \frac{N_x}{2}\right)$$

and $FOV_x$ denotes the field of view in this direction and is the size of the imaged area, which typically is 250 mm×250 mm. This indexing uses the convention that $K_x$ increases from negative to positive as u increases in steps of 1 from 0 to $N_x-1$, there being $N_x$ data values in the readout direction.

For the one dimensional phase encode compensation, at each readout line the correction for the displacement $m_y^j$ in the phase encode direction is $exp[-iK_y \cdot m_y^j]$ where $$K_y = \frac{2\pi}{FOV_y}\left(j - \frac{N_y}{2}\right).$$

For correction due to motion in the phase encoding direction, every point in one readout line is multiplied by the same complex factor, whereas for motion in the readout direction, the phase factor varies through $K_x$ at each point along a line.

In the image correction signal processing routine, the motion of the patient is parametised into a finite number of discrete movements at a number of sample points referred to as nodes. Whilst a plot of the patient's motion against time is more realistically a smooth curve over the imaging interval T, it is assumed that this motion may be well approximated by a piecewise constant, a piecewise linear or a cubic spline curve defined on the nodes. There may be one node for each readout line, alternatively one node could represent a group of several consecutive readout lines. If k-space is not traversed sequentially, the ordering of nodes should represent the temporal order of the acquisition.

In the motion correction routine, in the absence of any prior knowledge, it is initially assumed that the patient was in fact stationary during the data acquisition. Perturbations are then introduced into the patient's position at the nodes and the effect that these perturbations have on the resulting image quantified. If the image is improved by such a perturbation, as reflected by an improvement to a focus criterion, then this is indicative that the perturbation introduced in some way reflects the motion of the patient. By iterating round a loop in which the perturbations are varied and analysing the effect this has on the final image, an approximation to the actual motion of the patient during the course of the data acquisition is obtained, and this information is used to correct the image in a manner described above, where a linear motion is corrected for by multiplying each k-space line by a respective phase factor.

The preferred measure of the image "quality" is an entropy focus criterion. The term entropy is taken here to mean the degree of disorder in an image. A conventional measure of image entropy, E, is given by the equation:

$$E = \sum_{x,y} \frac{I_{x,y}}{I^{max}} \log \frac{I_{x,y}}{I^{max}},$$

where $I_{x,y}$ is the image intensity at a point x,y and $I^{max}$ is the maximum intensity in the image. Here intensity is defined as the modulus of the complex value at a particular point. The denominator $I^{max}$ must not be less than any value of $I_{x,y}$ at any point x,y upon any iteration. Phase compensation in MRI involves the addition of many complex numbers, with the final image being the detected magnitude of such sums, and this depends rather sensitively on the exact phase compensation applied. As a result the image maximum is variable, depending on the exact estimate of patient motion applied to calculate the image quality. For example, it may happen that the image maximum for a fully corrected image is much lower, perhaps by a factor two, than in the initial uncorrected image used as a starting point. A low maximum causes the above measure of global entropy to be lowered, which would not be desirable. Therefore a modified entropy focus criterion:

$$E = \sum_{x,y} \frac{I_{x,y}}{I^{maj}} \log \frac{I_{x,y}}{I^{maj}},$$

is more suitable for motion correction, where $I^{maj}$ is some number which is larger than any perturbed image maximum likely to be encountered. For an uncorrected image $J_0$, if its modulus $I_0$ is taken, this will have some maximum $I_0^{max}$. If this value is doubled, a suitable value for $I^{maj}$ is obtained for all images J derived from the image $J_0$.

Figure 3:
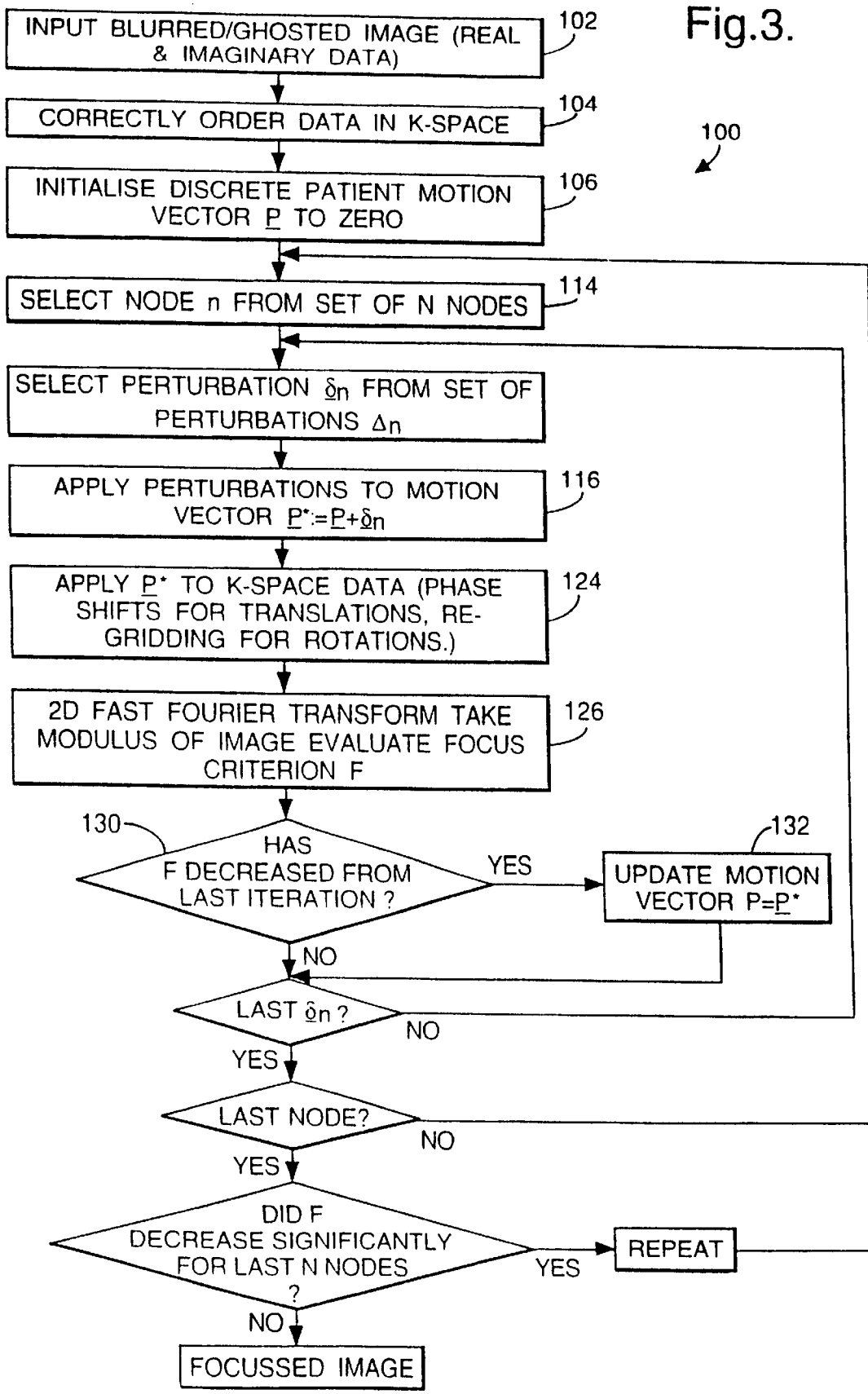
FIG. 3 is a flow diagram of an image correction routine performed by the FIG. 1 system.

Referring now to FIG. 3, there is shown a flow chart 100 of stages in an image processing routine for reducing the effect of patient motion in one dimension. The image processing is carried out on previously acquired data, as indicated by a box 102, obtained as sequential k-space lines, having an order starting at low negative frequencies and progressing through DC at a time $t^0$ to high positive frequencies. If necessary, the data in k-space may be reordered as indicated by a box 104. FIG. 3 shows the stages in a routine which performs the functions of:

i) generating an initial patient motion spline parameterisation;

ii) implementing a set of spline perturbations on the current best estimate of the motion spline;

iii) using the perturbed motion spline to obtain a compensated image;

iv) calculating a focus criterion for the compensated image;

v) comparing the focus criterion of the compensated image with that of the image prior to the perturbation.

Figure 4:
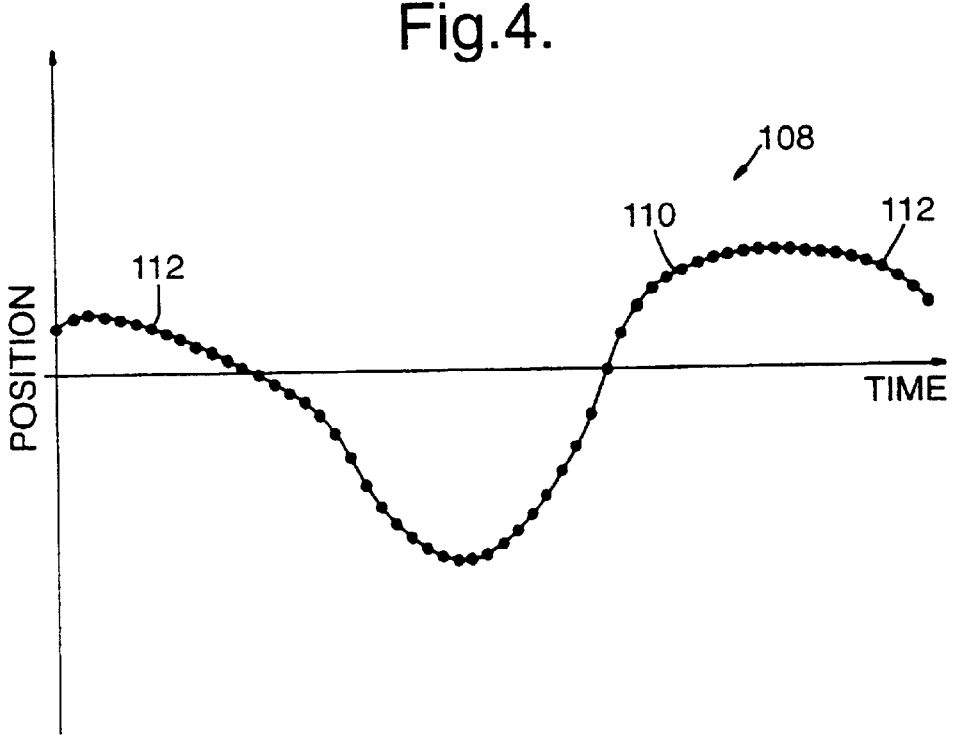
FIG. 4 is a example of a hypothetical patient motion curve.

In the flow chart 100, acquired data is passed to a patient motion curve initialisation stage 106. FIG. 4 shows a graph 108 showing a plot 110 of the movement of a patient during the image acquisition. The y-axis of the graph 108 is patient displacement and the x-axis represents time. Whilst the patient's motion is continuous, image acquisition shots are taken at discrete moments in time, as indicated by dots 112. The patient's motion is represented by a set of nodes, N, which may be less than the number of image acquisition shots. The initialisation stage 106 sets the initial patient motion curve to one in which the patient is stationary during the whole measurement period and hence the patient motion curve would lie along the x-axis of the graph 108.

In a node selection stage 114, a node n which is a member of the set of nodes N is selected, n∈N. A perturbation to the node n is selected and in a perturbation stage 116, the node n is moved, or perturbed, by a displacement parallel to the y-axis of graph 108 by the selected perturbation. Initially the perturbation will have a step size of 2 mm. If the motion curve of the patient is considered to be an N-dimension vector $\vec{P}$, then after the perturbation the vector is $\vec{P}+\vec{\delta}$ where $\vec{\delta}$ is from a perturbation set $\Delta_n$, $\vec{\delta}\in\Delta_n$, and in general is dependent on n.

Figure 5:
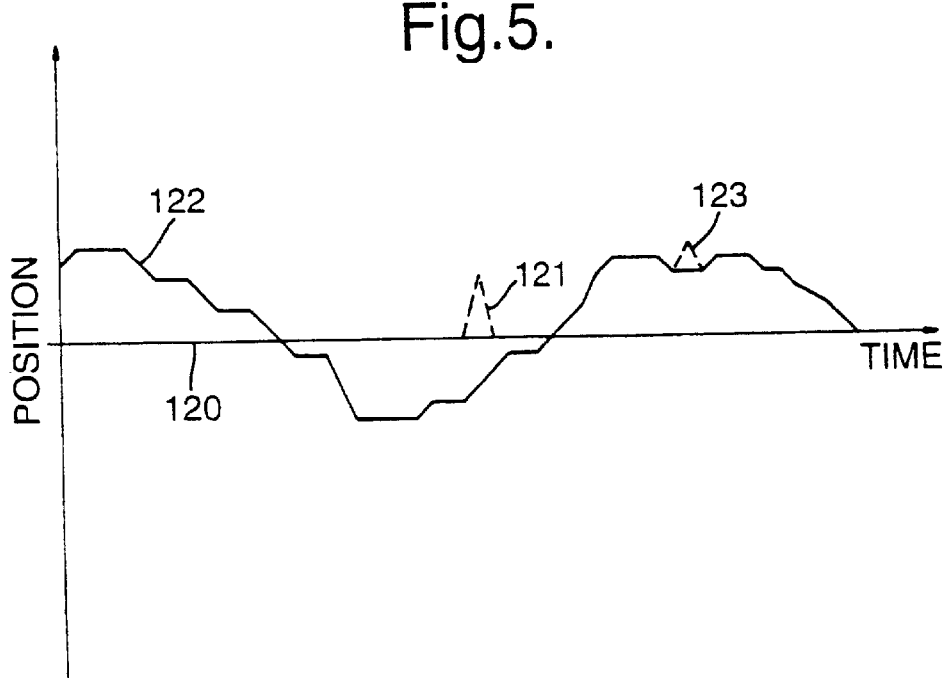
FIG. 5 shows a representation of the perturbation of a patient motion curve.

FIG. 5 shows a schematic representation of the effect on a patient motion curve of the perturbation stage 116. FIG. 5 shows a representation of the perturbation stage on an initialised patient motion curve and the effect of the stage on an intermediate patient motion curve. In FIG. 5, prior to the perturbation stage, the patient motion curve is represented by a solid line 120. The perturbation stage has the effect of adjusting the motion curve at a discrete time point, as indicated by a dashed line 121. The intermediate patient motion curve before the perturbation stage is represented by a solid line 122 with the perturbation stage having the effect of adjusting the intermediate motion curve at a discrete time point as indicated by a dashed line 123.

Referring again to FIG. 3, after the perturbation stage 116, the image processing routine applies the perturbation of this stage in a motion compensated data formation stage 124. In the stage 124, the k-space data is manipulated by the application of a phase correction, as described previously, with the phase shift to be applied being dependent on the perturbation to the patient motion curve. Once the k-space data has been manipulated, a Fourier transform stage 126 performs a 2-D fast Fourier transform on the manipulated data. In this stage the modulus of the complex Fourier transform $J_{\vec{P}}+\vec{\delta}$ is also obtained, generating a modified image $I_{\vec{P}}+\vec{\delta}$. The focus criterion, $F(I_{\vec{P}}+\vec{\delta})$ $\delta\in\Delta$, for this modified image is then calculated using the modified entropy focus criterion as given above. In a comparison stage 130, the focus criterion $F(I_{\vec{P}}+\vec{\delta})$ $\delta\in\Delta$ is compared with the focus criterion of the unperturbed image, $F(I_{\vec{P}})$.

If $F(I_{\vec{P}}+\vec{\delta})<F(I_{\vec{P}})$ $\delta\in\Delta$ then the perturbation $\delta$ has a beneficial effect on the overall image and so the motion vector $\vec{P}$ is updated so that $\vec{P}=\vec{P}+\vec{\delta}$ by a motion vector update stage 132, otherwise $\vec{P}$ remains unchanged. The routine cycles round in a loop updating $\vec{P}$ for the whole set of nodes until the decrease in entropy on traversing the whole node set is less than a set value, typically 0.2. The step size of the perturbation is then halved to 1 mm to give a finer splice approximation and the process repeated, followed by a further halving of the perturbation magnitude to 0.5 mm. Once the iterative process has been completed for this step size, the final patient motion vector is used to modify the data set from which a fully corrected image is obtained. The fully corrected image is then stored and displayed on a screen for analysis by a medical practitioner.

Figure 6A:
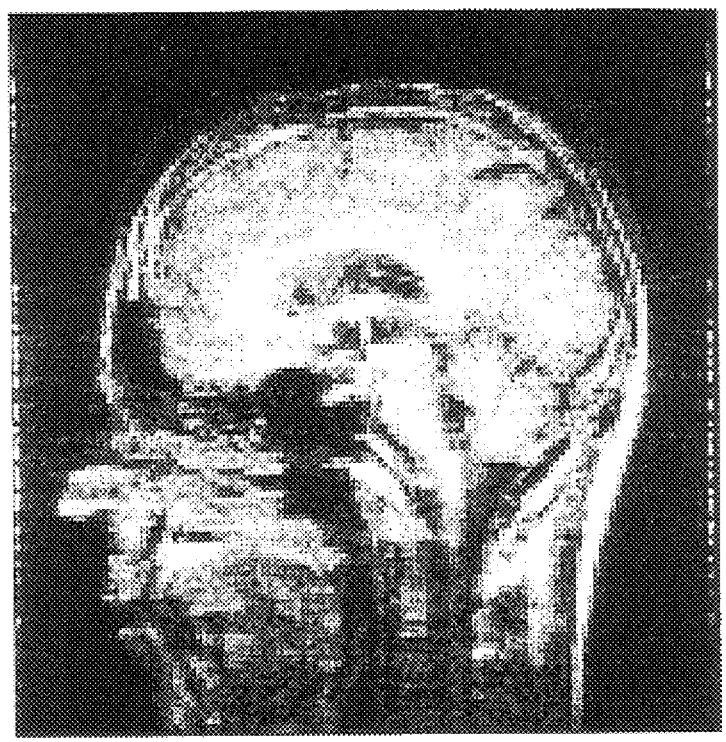
FIG. 6 shows MRI images before and after motion correction for motion in the readout direction.
Figure 6B:
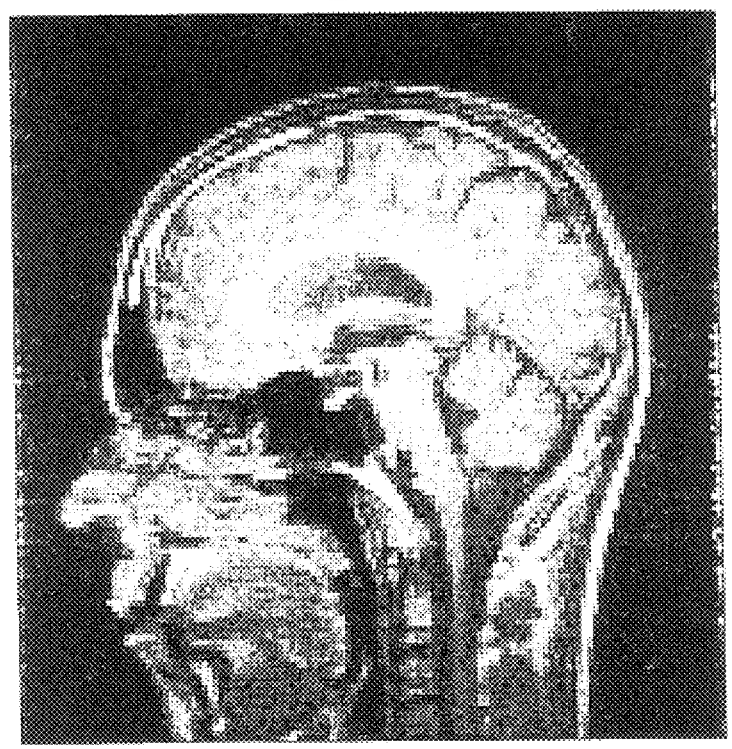

Referring now to FIG. 6 there are shown saggital MRI images before and after motion correction. The readout direction is head to foot and the phase encoding direction is anterio:posterior. FIG. 6a shows an image which has been corrupted by periodic patient motion along the readout direction. FIG. 6b shows an image obtained from the FIG. 6a data after the motion correction routine has modified the data.

Figure 7A:
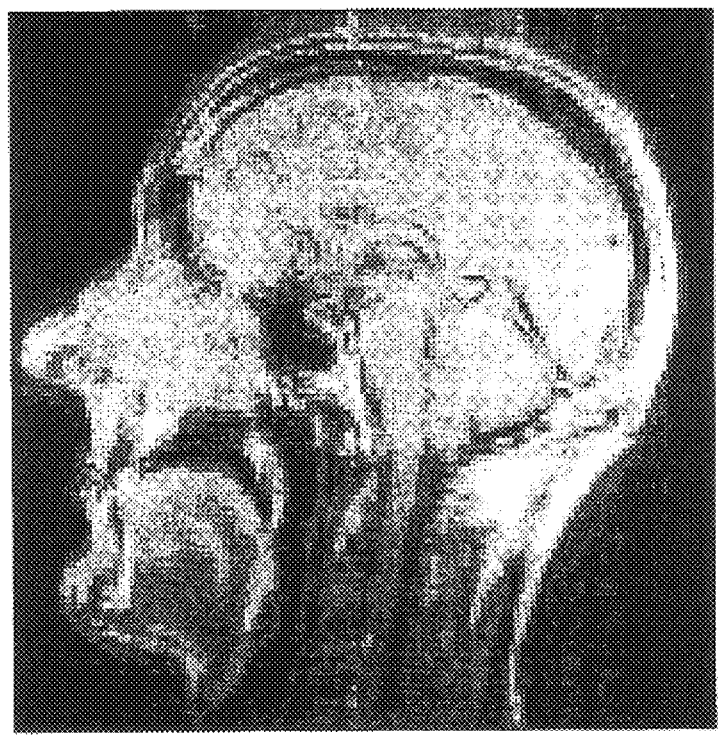
FIG. 7 shows MRI images before and after motion correction for motion in the phase encode direction.
Figure 7B:
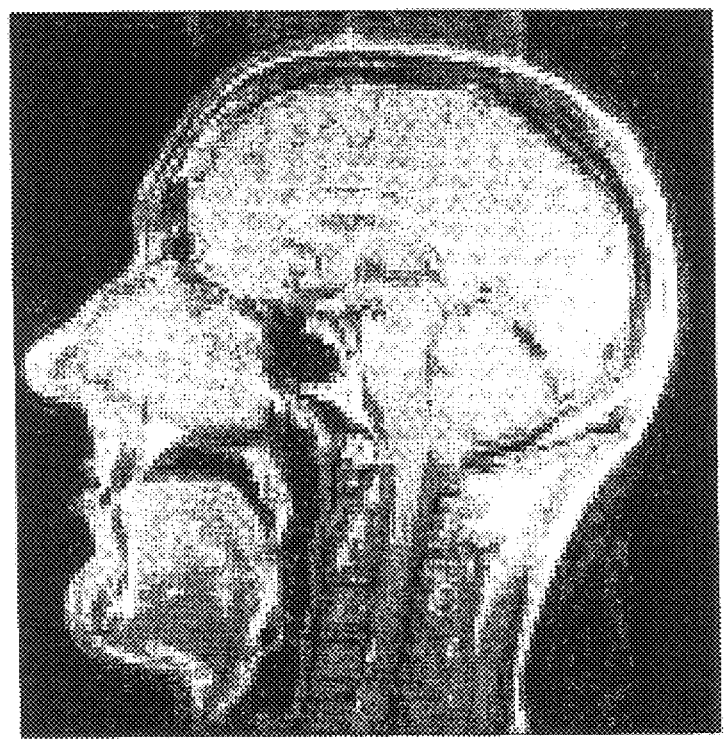
Figure 7C:
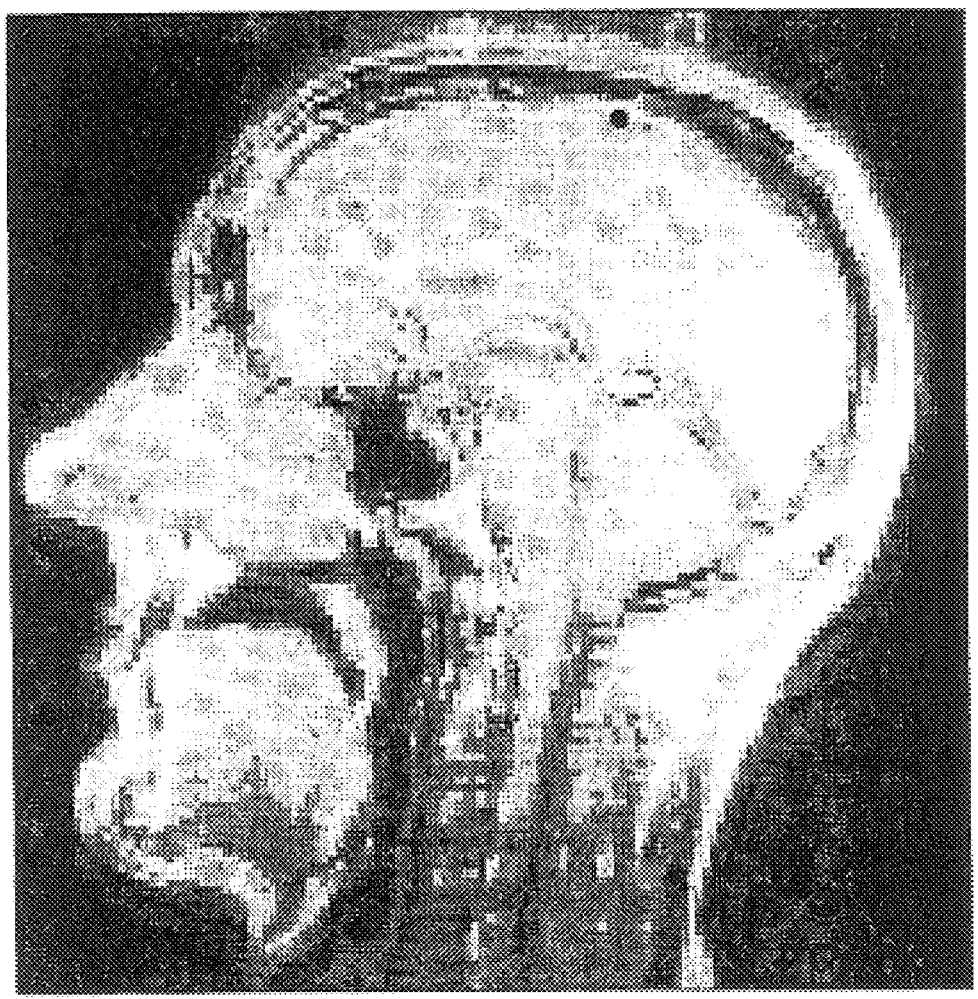

FIG. 7 shows saggital images before and after correction for motion in the phase-encode direction. FIG. 7a shows an image corrupted by a step motion during image acquisition. FIG. 7b shows an image after correction of motion using knowledge of the time and measure of the displacement and FIG. 7c shows an image after the correction routine has compensated for the motion. The FIG. 7c image is not as good as the manually focused image of FIG. 7b, with the manually focused image having a lower entropy than that of FIG. 7c, although the entropy of the FIG. 7c image is lower than that of the FIG. 7a image. It is possible that the image correction routine has found a solution which lies in a local minimum of the entropy function for the given set of perturbations.

Referring to FIG. 8 there is shown a pseudo-code listing of an algorithm to perform the stages of the FIG. 3 routine for data acquired in a data acquisition process in which the k-space lines have been obtained sequentially. Prior to the execution of the algorithm, the nodes in the patient motion spline, called m(t) are ordered $\{1, 2, \ldots, N\}$ where N is the number of nodes of the set of nodes N and is usually an odd number. The middle node is denoted midNode=(N−1)/2. A node ordering permutation $\pi(.)$ is defined as $\pi(1)$=midNode, $\pi(i)$=midNode+i/2 if i is even, $\pi(i)$=midNode—(i−1)/2 if i is odd for i $\in$ (1,2, . . . , N). This node ordering corresponds to working out radially from the mid k-space node which for most common acquisitions is at DC or zero frequency. Perturbing nodes near the mid-node tends to have the biggest effect on reducing entropy. An algorithm termination threshold, $\epsilon$, is set at a value of for example 0.2. In general the centric node ordering is not mandatory and would not be used for all acquisition modes.

Whilst the above description is a description of a routine for reducing the effects of motion of a patient in one direction, it may be possible to extend the principles of the routine to correct for movement in two dimensions, including rotational movements. Instead of a 1-D motion function m(t) to identify, in the 2-D case there are three m(t)=$m_x(t)$, $m_y(t)$, $m_r(t)$ where the motion curve $m_r(t)$ is the rotation. Using the same number and spacing of nodes as before, the discretised parameter space, which was described above, is now 3 times as large as for the 1-D case. The node ordering will again be centric from the DC line in the middle of k-space. At each node in a given sweep, the question arises as to what order to thread through the functions $m_x(t)$, $m_y(t)$, $m_r(t)=m_1(t)$, $m_2(t)$, $m_3(t)$ performing a 'node jiggle' on each in turn at the given node. This could be determined by experimentation—it is unlikely to be critical, but as a general rule it is best to put that parameter likely to give the biggest descent (entropy reduction) first, as this will give the fastest and most robust convergence. This was also the reason the centric node ordering described above was chosen. For the 2-D case, the major modification to the above pseudo-code is thus to insert a further do loop immediately nested inside the do 200 loop above, as shown in FIG. 9.

An alternative possibility for 2-D motion correction would be to reduce the dimensionality of the problem by rendering the three motion parameters at least partly separable. Taking the middle of the image as the nominal rotation centre O, then rotation has little defocusing effect in the neighbourhood of the centre. Thus a focus criterion defined on a limited rectangular region circumscribed about O could in principle be employed to estimate the translational motion in the neighbourhood of O only. Once the translation has been estimated and corrected for, a similar procedure could be used to estimate the rotation separately. This time the focus criterion would be evaluated on selected outer regions where any rotational blurring would be most pronounced.

Rather than using an entropy expression which is defined globally over a whole image, entropy expressions may be defined in a more localised manner. Instead of calculating the entropy over the whole image, it may be calculated "linewise", that is within an x-resolution cell or y-resolution cell respectively. This would be useful if it were known that the patient motion was confined to the y- or x-directions respectively. This would not therefore be appropriate for the general 2-D patient motion case. The modified linewise entropy expression may be given as:

$$E = \sum_x \sum_y \frac{I_{x,y}}{I_x^{maj}} \log \frac{I_{x,y}}{I_x^{maj}}.$$

In this expression it is better to include in the summation over x-resolution cells only those cells whose intersection with the initial image contains substantial energy over a certain threshold, otherwise off-image lines containing only defocus energy could be problematical.

It may be beneficial to calculate the entropy not on the whole image but rather on selected sub-regions of the image, for example rectangular regions. The sum over all or selected sub-region entropies could then be formed to give a global image focus criterion. Care would need to be exercised in the implementation of this concept since image "mass" or intensity can migrate from one sub-region to another due to blurring, and thus one sub-region is not independent from its neighbours. The effect of this migration is less if the sub-regions are taken to be quite large rectangles, occupying at least a few percent of the total image area.

Ghosting in images tends to occur along the phase encode direction. The image resolution may be reduced in the readout direction without affecting the node placements or the resolution of ghosts in the phase encode direction. The focusing can be applied on the reduced resolution image to obtain the motion spline. This is then applied retrospectively to a full resolution original image to obtain a full resolution motion corrected image. This technique has the benefit of reducing computation time since the reduced resolution image contains fewer points.

An alternative strategy for node perturbation is to allow the perturbation of each node to take any arbitrary value to minimise the entropy, rather than limiting the perturbation to a few integral multiples of 2 mm, for example.

Entropy-based focus criteria are not the only possible choices for a focus criterion. It would be preferable to have a focus criterion which could be computed directly in k-space or even hybrid-space, since this would result in a considerable saving in computing time. The focus criterion is a function which is optimised when the patient motion is correctly estimated, either being maximised or minimised at this point.

As an example of an alternative type of focus criterion, an image variability focus criterion might be employed, where the focus measure detects the presence of a large number of oscillatory terms in a defocused image. The measure of image variability is a standard statistical one: (image standard deviation)/(mean intensity) or (variance)/(mean squared intensity). The latter may be expressed as follows:

$$F_{IV}(J) = \frac{\sum_{x,y}(I_{x,y}^2 - \vec{I})^2}{\vec{I}^2},$$

where $\vec{I}$ is the image mean squared $\Sigma I_{x,y}^2$. $I_{x,y}^2$ is the magnitude squared (or intensity) of the x,y$^{th}$ pixel in the modulus image I. If at focus the image is characterised by minimum variability, then this focus criterion will be minimised at focus. The normalisation by the mean is designed to compensate for variations in the absolute image level. This is not strictly necessary since by Parseval's theorem of Fourier analysis, $\vec{I}$ for a phase-corrected image will be equal to $\vec{I}$ before any compensation. Thus this last equation may be simplified to:

$$F_{IV}(J) = \sum_{x,y} I_{x,y}^4.$$

The operation of the motion correction routine may be modified in a variety of ways. For example, the node set N and the sequence in which nodes are traversed may be altered and may be altered dynamically as the algorithm proceeds. The perturbation set $\Delta_n$ may be modified, as may the type of spline approximant. The optimisation algorithm may be adapted, as may the exact manner in which the image compensation is performed. For example rather than perturbing a single node, it may be beneficial to perturb two or more nodes together, with the algorithm varying the amplitude of each node perturbation.

In fast scanning MRI image acquisition, such as turbo spin-echo imaging, k-space is rapidly traversed using only a limited number of equally spaced lines in the phase-encode direction. It is then traversed again, moving along by one line until all of k-space has been acquired. Each successive sub-image is formed from slightly different k-space lines, and only one will contain the DC line. As the patient moves, successive sub-images will be translated, and, in the 2-D generalisation rotated, relative to each other reflecting this movement. It may be possible to determine such movement approximately by maximising the normalised cross-correlation of adjacent sub-images. This method may be a useful starting point for a further routine using the previous focus criterion approach. It may also be possible to use the focus criterion approach, searching through a number of possible translational or rotational shifts to optimise a focus criterion on the composite sub-image. It may be possible to merge the k-space lines of sub-image pairs which are interlaced in k-space to form a composite sub-image. This may then be repeated on the higher resolution sub-images formed, with the relative translation and rotation of these sub-images being estimated via a cross-correlation. This merging could continue until a final image is formed, encompassing the whole of k-space.

A benefit of the above image processing techniques is that the data acquisition stage is unaffected and therefore the technique may be applied retrospectively to previously acquired images. Indeed the image processing may be carried out on a computer which is independent of the MRI scanner.

Rotational motion part way through a scan causes a rotation of the corresponding section of k-space. If the image is to be reconstructed from k-space using an FFT, the rotated data should be interpolated or "re-gridded" to lie on a regular Cartesian grid. Direct integration with an irregular grid can be used instead of the FFT but this is slower. An alternative option is to perform rotation compensation in the image domain but this requires the original data to have a global phase correction applied to make the k-space Hermitian. Furthermore, the correction scheme requires the rotation to be discrete with periods of constant position between motion. Re-gridding is the preferred option.

A convolution kernel is chosen that is a balance between computational speed, accuracy and the unwanted introduction of extra image artefacts. A separable windowed sinc kernel h is taken, where $$h(k)=[1+\cos(\pi k/k_r)]\mathrm{sinc}(4k/k_r),$$

where k is the number of k-space points along the frequency encode or phase encode direction from the k-space position being interpolated to the data point and $k_r$, the kernel "radius" is 4.78, following a technique described by S. R. Marschener and R. J. Lobb in Proc. Visualization '94, R. D. Bergeron and A. E. Kaufman, Ed., IEEE Computer Society Press, 1994, pages 100–107. Because the focus criterion technique is sensitive to ghosts, data is oversampled to reduce post-aliasing effects. The first sidelobes of the kernel transform that cause post-aliasing into the original image region are 31 dB below the central region, which itself varies by no more than 0.5% of its value at the image centre.

The convolution process sums data points from a region of k-space around the position to be interpolated, applying the kernel weighting to each point. Points in the summation are ignored if they are beyond the edge of k-space or in the oversampled regions or undersampled regions that occur on rotation. To account for the un-even sampling, the kernel values h(k) are summed and this sum is used to normalise the interpolated point. If this sum is too small (taken to be less than h(k=0)/5) the interpolated value is set to zero. For rotation angles of less than 15°, zero filling has been shown to be acceptable.

Rotation of a complete image should not change the image entropy. If the entire k-space of a good image is rotated by up to 15°, the largest entropy change from the original image is approximately 0.5% of the original image entropy, which compares with normal entropy changes due to motion compensation of approximately 2%.

This rotation of k-space rotates the image about its centre. For most images, the true centre of rotation will not be the image centre. To counteract this, the rotated sections of k-space must have an unknown translational correction applied after the rotation correction.

The real and imaginary data are separately interpolated. To overcome problems if the image is centred in the field of view because of the FFT process resulting in very rapid sign changes of the real and imaginary k-space data, the image is shifted half a field of view in x and y with wrap around allowed, prior to transforming to k-space.

Trials using simulated motion on a good quality image with a nod-type motion of between 0° and 5° within ±10 nodes of the k-space centre show that it is possible to determine rotation to the nearest degree by trying each of the combinations of five rotation angles and twenty step times followed by a simple gradient descent algorithm for the translational correction. The process used to compensate for rotational motion is to repeat the following procedure for each possible combination of rotation angle and step time:

(i) zero pad image to four times original area
(ii) shift image by half the new FOV in x and y allowing wrap around
(iii) perform FFT to k-space
(iv) apply re-gridding to compensate for trial rotation angle and step time
(v) perform iFFT to image domain
(vi) shift image by half the FOV to correctly recentre it
(vii) extract the image (i.e. discard the previously zero-padded region so that the new image is now the same size as the original)
(viii) apply a gradient descent algorithm to find the translational correction for unknown centre of rotation.

Further distinct algorithmic methods have been developed and found to be successful on a large number of images. These further methods could be considered to be evolutionary developments of the "node jiggle" approach described above. The methods differ in the type of successive approximation to the true patient motion and the type of search scheme. Normally, groups of k-space lines are perturbed rather than one at a time. For solving a general two dimensional problem of patient translations and rotations, the search space is potentially very large and so it is beneficial to introduce short cuts which reduce the time taken for a search and minimise the risk of the search becoming stuck in a local entropy minimum.

Figure 10:
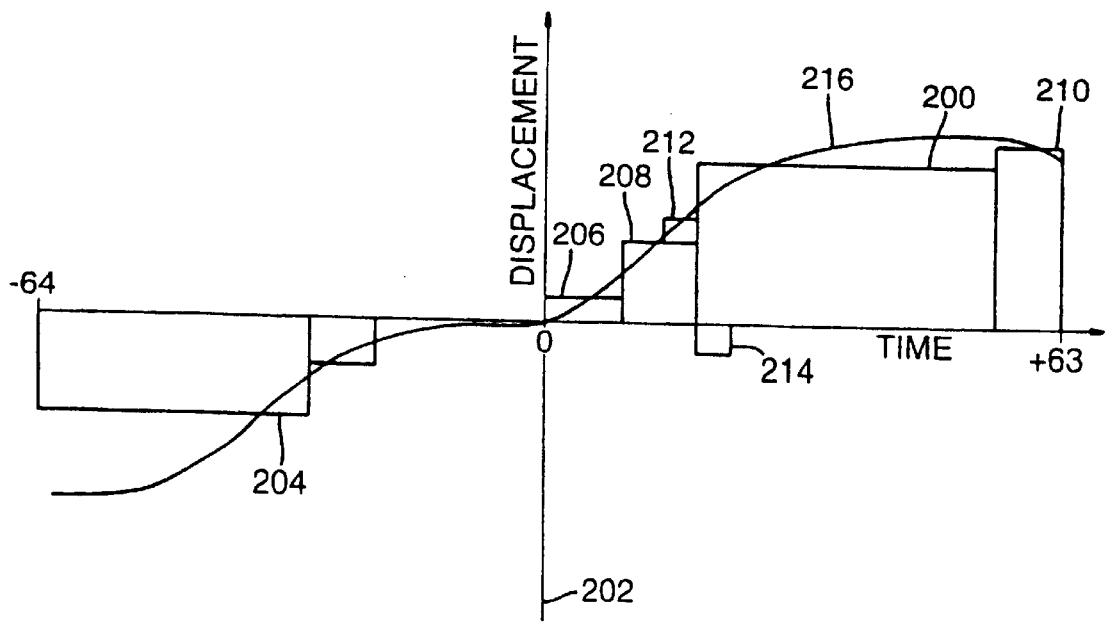
FIGS. 10 to 12 are schematic illustrations of further image correction techniques.

The first of these further methods is termed "Focus via Successive Approximation" or FOSA for short, which is illustrated schematically in FIG. 10. In this method, the search routine starts with a large scale segment length 200 of length 16 or 32 k-space lines. The position of this segment length 200 is varied to the right of the origin 202 and at each position its height, or magnitude of the displacement, is varied in the search for a large focus criterion descent. If such a large descent is found, the patient motion curve is updated. A similar search is then carried out to the left of the origin 202 using a segment length 204. This combined process will yield the best piecewise constant approximation to the patient motion at the crude scale used (16 or 32 lines). The process is then repeated with the segment length reduced by half and again until a segment length of two lines is reached. In FIG. 10, segment lengths 200 and 204 were found in the first phase, segment lengths 206, 208, and 210 in a second phase and segment lengths 212 and 214 in a third phase, approximating to an actual patient motion curve 216. The additional segment lengths may effectively add to or subtract from displacements from earlier segment lengths, as illustrated by segment lengths 212 and 214 respectively.

For the general two dimensional case, the search is in effect five dimensional over rotation, phase encode and frequency encode amplitudes and segment position and length. This is potentially slow to achieve computationally. It may therefore be preferable to do a search on rotation amplitude first, since this is the most likely motion to occur for cranial scans. Pure phase encode or frequency encode translations would seldom occur in isolation without being accompanied by rotation. Thus if a rotation is detected, a search on phase encode or frequency encode translations can then be performed. Having determined phase encode or frequency encode displacements, the search can be alternated back to rotation to possibly improve the first estimate.

Figure 11:
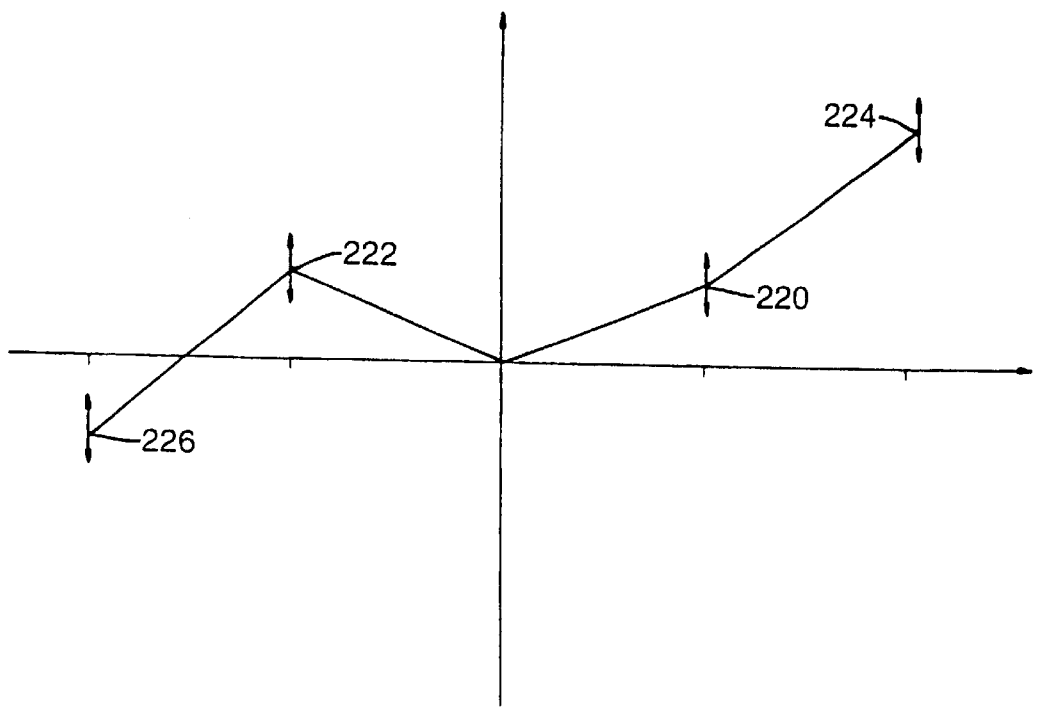

The second further method is termed "Advanced Node Jiggle" or ANJI for short and is illustrated schematically in FIG. 11. As with the FOSA method, the ANJI method progresses from a crude large approximation to the patient motion to a smaller scale approximation capable of following the finer details of movement. Initially four nodes 220 to 226 across k-space, separated by a segment length of thirty-two k-space lines (assuming a total of 128 k-space lines) are perturbed. Node perturbation is performed in pairs of nodes, with the nodes of each pair being on opposite sides of the origin 228. Thus nodes 220 and 222 form a pair, as do nodes 224 and 226. For each pair, the optimum displacement is determined for reducing the focus criterion, with the patient motion between nodes being assumed to be piecewise linear. For each pair of nodes, the amplitudes in the frequency encode and phase encode directions are perturbed jointly. In a further stage, the separation between nodes is halved and the process repeated, proceeding outwards from the centre of k-space radially. A given stage can be repeated if desired until there is no further focus criterion descent and the search then proceeds to the next stage until the segment length becomes four or two lines at which point the search terminates.

To extend the ANJI technique to fully two dimensional correction, encompassing patient rotation as well as translation, joint searching would be computationally prohibitive and therefore the search would alternate between nodes 220 and 222 and then nodes 224 and 226, and similar for further stages. As with the FOSA method, it may be possible to restrict the main amplitude search to rotation, alternating with joint phase encode and frequency encode searches at nodes where a rotation is detected via the occurrence of a descent.

The third further method is termed "Increasing Phase Encode Resolution Search" or IPERS for short. The FOSA and ANJI methods develop compensated images and apply the focus criterion to these at the full phase encode resolution, i.e. they use all the k-space lines in developing the image. It is however possible to develop an image over a subset of k-space lines, if the subset is symmetrical about the centre of k-space to avoid symmetry artefacts, and this "subimage" is self-contained in so far as it contains information on how to refocus the image over its particular subset of lines, even if it may have rather low resolution in the phase encode dimension. There is no information in the higher frequency lines which could help determine patient motion parameters associated with the lines in the subset. There is therefore no need to develop the image at the maximum resolution in order to determine patient motion parameters near the centre of k-space.

Figure 12:
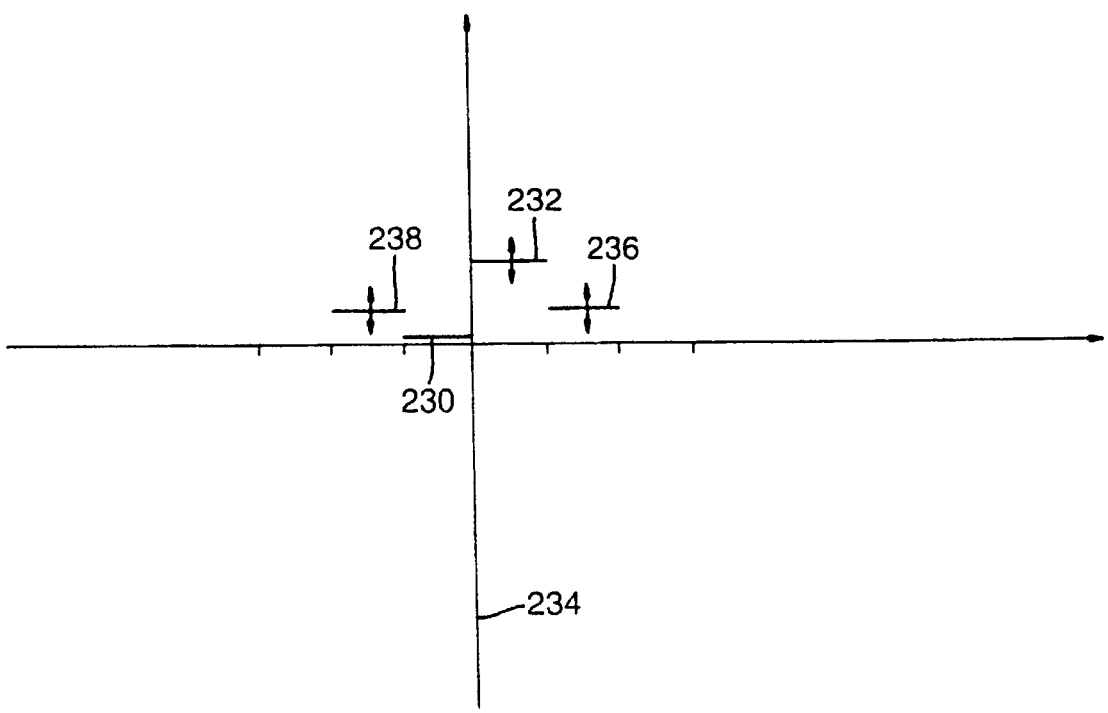

The IPERS method is shown schematically in FIG. 12 and uses a piecewise constant approximation to the patient motion curve, with a segment length of typically four k-space lines. The method starts with two segment lengths 230 and 232 on opposite sides of the origin 234. Segment length 230 is held at zero amplitude for the whole IPERS method, with patient motions being determined relative to this reference. A search is carried out on rotation amplitude and frequency encode and phase encode displacements on the segment length 232, looking for the largest descent in the focus criterion in the subimage formed on the current interval of eight k-space lines only. On completion of this stage, the k-space interval is extended by two segments 236 and 238 of length four on either side of the origin 234, giving a k-space interval of sixteen lines on which to develop a subimage. The patient motion curve is initialised at zero for the new segments and the amplitudes of these new segments are then varied.

Rotation amplitude is first varied on the two segments then frequency encode amplitudes then phase encode amplitudes. The patient motion curve is updated as usual when focus criterion descent occurs. The method proceeds adding segments until the whole of k-space is covered, and the full patient motion curve obtained.

Once patient motion is determined in a given region of k-space, it is determined once and for all. There is no need to revisit the same area of k-space as the FOSA and ANJI methods do at varying scales.

As with the FOSA and ANJI methods, it is possible to alternate a given amplitude search rather than to search jointly, thereby replacing a two dimensional search with effectively a one dimensional search and also to perform a frequency encode and a phase encode search only when a descent has occurred in the rotation search. The entropy focus criterion described above was calculated on the whole image. A Box Entropy Focus Criterion may be defined to make the focus criterion more sensitive to lower contrast images, for example brain tissue. The initial unfocussed image $I^0$ is divided into a number (typically sixty-four) equal rectangles, and the r maximum in each rectangle is determined. If the maximum is less than a set fraction, say 0.1, of the image global maximum $I^0_{max}$, then the box is labelled "dark". The "box entropy" of a general image I is calculated as the sum over k of entropies $BE^k$ calculated for each non-dark box. Thus if $I_{i,j}{}^k$ is the i,j$^{th}$ pixel of the k$^{th}$ box, and $I^{0,k}_{max}$ is the maximum of the k$^{th}$ box of the initial unfocussed image $I^0$, the entropy of the k$^{th}$ box is defined as:

$$BE^k = \Sigma (I_{i,j}{}^k / I_{max}{}^{0,k}) \log(I_{i,j}{}^k / I_{max}{}^{0,k}).$$

In practice, a further scaling and thresholding of pixel values is done to prevent low value pixels from overcontributing to the sum. It is desirable to have a balance between high and low pixels in the image, with the contribution of the middle value pixels de-emphasised.

Whilst the invention has been described in relation to MRI image improvement, the hereinbefore described principles may be extendible to other imaging techniques where patient motion results in a degradation of the image quality, for example tomographic scanning using x-rays or ultrasound scanning.

In addition to correction for patient motion, the techniques of modifying a data set in order to optimise a focus criterion may be applicable to situations where timing errors or instrumental factors result in image degradation. For example, in EPI image acquisition timing errors result in Nyquist ghost images being formed. Such artefacts may be corrected where there is a physical and mathematical relation between an image artefact and its physical cause.

What is claimed is:

1. A method for generating a corrected image of an object by:
   (i) employing scanning means (12) to scan an object and derive an image data set from signals received from the object, and
   (i) manipulating the data set to reduce unwanted artefact effects associated with the object and produce corrected image data to yield an artefact-reduced image,
   characterised in that manipulating the data set incorporates the steps of:
   a) providing a focus criterion for the image data set prior to correction,
   b) generating a trial artefact corresponding to a possible artefact cause,
   c) producing a manipulated version of the image data set in which the trial artefact is counteracted and providing a focus criterion for this version,
   d) varying the trial artefact and repeating the preceding step iteratively to produce a manipulated version of the image data set compensated for a version of the trial artefact associated with optimisation of the focus criterion to the extent obtainable by iteration, and
   e) producing corrected image data from a manipulated version of the image data set associated with optimisation of the focus criterion.

2. A method according to claim 1 characterised in that the said trial artefact is a first trial artefact, and after step (d), steps (b) to (d) are repeated for a second trial artefact.

3. A method according to claim 1 characterised in that the image is a physiological image and the unwanted artefact effects are associated with object motion during operation of the scanning means (12).

4. A method according to claim 3 characterised in that the scanning means is a magnetic resonance imaging (MRI) scanning means (12).

5. A method for generating a corrected image of an object by:
   (i) employing scanning means (12) to scan an object and derive an image data set from signals received from the object, and
   (i) manipulating the data set to reduce unwanted artefact effects associated with the object and produce corrected image data to yield an artefact-reduced image,
   characterised in that manipulating the data set incorporates the steps of:
   a) providing a focus criterion for the image data set prior to correction,
   b) generating a modelled artefact corresponding to a possible artefact cause,
   c) producing a manipulated version of the image data set in which the modelled artefact is counteracted and providing a focus criterion for this version,
   d) varying the modelled artefact and repeating the preceding step iteratively to produce a manipulated version of the image data set compensated for a version of the modelled artefact associated with optimisation of the focus criterion to the extent obtainable by iteration, and
   e) producing corrected image data from a manipulated version of the image data set associated with optimisation of the focus criterion, wherein the image is a physiological image and the unwanted artefact effects are associated with object motion during operation of the scanning means (12), wherein the scanning means is a magnetic resonance imaging (MRI) scanning means (12), wherein the focus criterion is an image entropy criterion.

6. A method according to claim 5 characterised in that the artefact effects arise from object displacement and the step of producing a manipulated version of the image data set incorporates multiplying a plurality of the received signals by respective phase factors.

7. A method according to claim 6 characterised in that the MRI scanning means (12) defines a data readout direction, and to correct for a displacement $m_x^j$ of an image data set point in this direction the phase factor is $\exp[-K_x; m_x^j]$, where $K_x = 2/FOV_x(u - N_x/2)$, $FOV_x$ is the field of view in the readout direction and u is an index number of the said image data set point in a line of such points extending in the readout direction and containing a number $N_x$ of such points.

8. A method according to claim 6 characterised in that the MRI scanning means (12) defines a phase encode direction, the image data set is a set of lines of data points, and to correct for a displacement $m_y^j$ of a line of index number j in the image data set, the phase factor is $\exp[-K_y; m_y^j]$, where $K_y = 2/FOV_y(u - N_y/2)$, $FOV_y$ is the field of view in the phase encode direction and $N_y$ is the number of lines in the data set.

9. A method for generating a corrected image of an object by:
   (i) employing scanning means (12) to scan an object and derive an image data set from signals received from the object, and
   (i) manipulating the data set to reduce unwanted artefact effects associated with the object and produce corrected image data to yield an artefact-reduced image,
   characterised in that manipulating the data set incorporates the steps of:
   a) providing a focus criterion for the image data set prior to correction,
   b) generating a modelled artefact corresponding to a possible artefact cause,
   c) producing a manipulated version of the image data set in which the modelled artefact is counteracted and providing a focus criterion for this version,
   d) varying the modelled artefact and repeating the preceding step iteratively to produce a manipulated version of the image data set compensated for a version of the modelled artefact associated with optimisation of the focus criterion to the extent obtainable by iteration, and
   e) producing corrected image data from a manipulated version of the image data set associated with optimisation of the focus criterion, wherein the focus criterion is an image entropy criterion determined from subdivisions of an image which are identified as being non-dark.

10. A method for generating a corrected image of an object by:
    (i) employing scanning means (12) to scan an object and derive an image data set from signals received from the object, and
    (i) manipulating the data set to reduce unwanted artefact effects associated with the object and produce corrected image data to yield an artefact-reduced image,
    characterised in that manipulating the data set incorporates the steps of:
    a) providing a focus criterion for the image data set prior to correction, b) generating a modelled artefact corresponding to a possible artefact cause, c) producing a manipulated version of the image data set in which the modelled artefact is counteracted and providing a focus criterion for this version, d) varying the modelled artefact and repeating the preceding step iteratively to produce a manipulated version of the image data set compensated for a version of the modelled artefact associated with optimisation of the focus criterion to the extent obtainable by iteration, and e) producing corrected image data from a manipulated version of the image data set associated with optimisation of the focus criterion, wherein the scanning means is an MRI scanning means (12), characterised in that the modelled artefact is associated with object motion, the image data set is a set of lines of data points and the step of iteratively varying the modelled artefact is performed initially using a data segment incorporating a larger number of such lines relative to those of a data segment used later.

11. A method for generating a corrected image of an object by:

(i) employing scanning means (12) to scan an object and derive an image data set from signals received from the object, and (i) manipulating the data set to reduce unwanted artefact effects associated with the object and produce corrected image data to yield an artefact-reduced image, characterised in that manipulating the data set incorporates the steps of:

a) providing a focus criterion for the image data set prior to correction, b) generating a modelled artefact corresponding to a possible artefact cause, c) producing a manipulated version of the image data set in which the modelled artefact is counteracted and providing a focus criterion for this version, d) varying the modelled artefact and repeating the preceding step iteratively to produce a manipulated version of the image data set compensated for a version of the modelled artefact associated with optimisation of the focus criterion to the extent obtainable by iteration, and e) producing corrected image data from a manipulated version of the image data set associated with optimisation of the focus criterion, wherein the scanning means comprises an MRI scanning means (12), characterised in that the modelled artefact is associated with object motion, and the step of iteratively varying the modelled artefact is performed initially using a smaller number of nodes relative to those used later.

12. A method for generating a corrected image of an object by:

(i) employing scanning means (12) to scan an object and derive an image data set from signals received from the object, and (i) manipulating the data set to reduce unwanted artefact effects associated with the object and produce corrected image data to yield an artefact-reduced image, characterised in that manipulating the data set incorporates the steps of:

a) providing a focus criterion for the image data set prior to correction, b) generating a modelled artefact corresponding to a possible artefact cause, c) producing a manipulated version of the image data set in which the modelled artefact is counteracted and providing a focus criterion for this version, d) varying the modelled artefact and repeating the preceding step iteratively to produce a manipulated version of the image data set compensated for a version of the modelled artefact associated with optimisation of the focus criterion to the extent obtainable by iteration, and e) producing corrected image data from a manipulated version of the image data set associated with optimisation of the focus criterion, wherein the scanning means comprises an MRI scanning means (12), characterised in that the modelled artefact is associated with object motion, the MRI scanning means (12) is arranged to use a sub-set of the data set to obtain a sub-image, the step of iteratively varying the modelled artefact is performed over a region corresponding to the sub-set, and the sub-set is extended later in such iteration.

13. An imaging system incorporating:

(i) scanning means (12) for scanning an object and deriving an image data set from signals received from the object, and (ii) processing means (38) for manipulating the image data set to reduce unwanted artefact effects associated with the object and produce corrected image data to yield an artefact-reduced image, characterised in that the processing means (38) is arranged to execute the following functions:

a) provision of a focus criterion for the image data set prior to correction, b) generation of a trial artefact corresponding to a possible artefact cause, c) production of a manipulated version of the image data set in which the trial artefact is counteracted and provision of a further focus criterion for this version, d) variation of the trial artefact and repetition of the preceding function iteratively to produce a manipulated version of the image data set compensated for a version of the trial artefact associated with optimisation of the focus criterion to the extent obtainable by iteration, and e) production of corrected image data from the manipulated version of the image data set associated with optimisation of the focus criterion.

14. An imaging system according to claim 13 characterised in that the said trial artefact is a first trial artefact and after function (d) the processing means (38) is arranged to repeat functions (b) to (d) for a second trial artefact.

15. An imaging system according to claim 13 characterised in that the image is a physiological image and the unwanted artefact effects are associated with object motion during operation of the scanning means (12).

16. An imaging system according to claim 15 characterised in that the scanning means is an MRI scanning means (12).

17. An imaging system incorporating:

(i) scanning means (12) for scanning an object and deriving an image data set from signals received from the object, and (ii) processing means (38) for manipulating the image data set to reduce unwanted artefact effects associated with the object and produce corrected image data to yield an artefact-reduced image, characterised in that the processing means (38) is arranged to execute the following functions:

a) provision of a focus criterion for the image data set prior to correction, b) generation of a modelled artefact corresponding to a possible artefact cause, c) production of a manipulated version of the image data set in which the modelled artefact is counteracted and provision of a further focus criterion for this version, d) variation of the modelled artefact and repetition of the preceding function iteratively to produce a manipulated version of the image data set compensated for a version of the modelled artefact associated with optimisation of the focus criterion to the extent obtainable by iteration, and e) production of corrected image data from the manipulated version of the image data set associated with optimisation of the focus criterion, wherein the image is a physiological image and the unwanted artefact effects are associated with object motion during operation of the scanning means (12), wherein the scanning means is an MRI scanning means (12), wherein the focus criterion is an image entropy criterion.

18. An imaging system according to claim 17 characterised in that the artefact effects are associated with object displacement and the processing means (38) is arranged to implement the function of producing a manipulated version of the data set by multiplying a plurality of the received signals by respective phase factors.

19. An imaging system according to claim 18 characterised in that the MRI scanning means (12) defines a data readout direction, and to correct for a displacement $m_x^j$ of an image data set point in this direction the phase factor is $\exp[-K_x.m_x^j]$, where $K_x=2/FOV_x(u-N_x/2)$, $FOV_x$ is the field of view in the readout direction and u is an index number of the said image data set point in a line of such points extending in the readout direction and containing a number $N_x$ of such points.

20. An imaging system according to claim 17 characterised in that the MRI scanning means (12) defines a phase encode direction, the image data set is a set of lines of data points, and to correct for a displacement $m_y^j$ of a line of index number j in the image data set the phase factor is $\exp[-K_y.m_y^j]$, where $K_y=2/FOV_y(u-N_y/2)$, $FOV_y$ is the field of view in the phase encode direction and $N_y$ is the number of lines in the data set.

21. An imaging system incorporating:

(i) scanning means (12) for scanning an object and deriving an image data set from signals received from the object, and (ii) processing means (38) for manipulating the image data set to reduce unwanted artefact effects associated with the object and produce corrected image data to yield an artefact-reduced image, characterised in that the processing means (38) is arranged to execute the following functions:

a) provision of a focus criterion for the image data set prior to correction, b) generation of a modelled artefact corresponding to a possible artefact cause, c) production of a manipulated version of the image data set in which the modelled artefact is counteracted and provision of a further focus criterion for this version, d) variation of the modelled artefact and repetition of the preceding function iteratively to produce a manipulated version of the image data set compensated for a version of the modelled artefact associated with optimisation of the focus criterion to the extent obtainable by iteration, and e) production of corrected image data from the manipulated version of the image data set associated with optimisation of the focus criterion, wherein the focus criterion is an image entropy criterion determined from sub-divisions of an image which are identified as being non-dark.

22. An imaging system incorporating:

(i) scanning means (12) for scanning an object and deriving an image data set from signals received from the object, and (ii) processing means (38) for manipulating the image data set to reduce unwanted artefact effects associated with the object and produce corrected image data to yield an artefact-reduced image, characterised in that the processing means (38) is arranged to execute the following functions:

a) provision of a focus criterion for the image data set prior to correction, b) generation of a modelled artefact corresponding to a possible artefact cause, c) production of a manipulated version of the image data set in which the modelled artefact is counteracted and provision of a further focus criterion for this version, d) variation of the modelled artefact and repetition of the preceding function iteratively to produce a manipulated version of the image data set compensated for a version of the modelled artefact associated with optimisation of the focus criterion to the extent obtainable by iteration, and e) production of corrected image data from the manipulated version of the image data set associated with optimisation of the focus criterion, wherein the scanning means is an MRI scanning means (12), characterised in that the modelled artefact is associated with object motion, the image data set is a set of lines of data points and the processing means (38) is arranged to perform iterative variation of the modelled artefact using initially a data segment incorporating a larger number of such lines relative to those of a data segment used later in the iteration function.

23. An imaging system incorporating:

(i) scanning means (12) for scanning an object and deriving an image data set from signals received from the object, and (ii) processing means (38) for manipulating the image data set to reduce unwanted artefact effects associated with the object and produce corrected image data to yield an artefact-reduced image, characterised in that the processing means (38) is arranged to execute the following functions:

a) provision of a focus criterion for the image data set prior to correction, b) generation of a modelled artefact corresponding to a possible artefact cause, c) production of a manipulated version of the image data set in which the modelled artefact is counteracted and provision of a further focus criterion for this version, d) variation of the modelled artefact and repetition of the preceding function iteratively to produce a manipulated version of the image data set compensated for a version of the modelled artefact associated with optimisation of the focus criterion to the extent obtainable by iteration, and e) production of corrected image data from the manipulated version of the image data set associated with optimisation of the focus criterion, wherein the scanning means is an MRI scanning means (12), characterised in that the modelled artefact is associated with object motion and the processing means (38) is arranged to perform iterative variation of the modelled artefact using initially a smaller number of nodes relative to those used later in the iteration function.

24. An imaging system incorporating:

(i) scanning means (12) for scanning an object and deriving an image data set from signals received from the object, and (ii) processing means (38) for manipulating the image data set to reduce unwanted artefact effects associated with the object and produce corrected image data to yield an artefact-reduced image, characterised in that the processing means (38) is arranged to execute the following functions:

a) provision of a focus criterion for the image data set prior to correction, b) generation of a modelled artefact corresponding to a possible artefact cause, c) production of a manipulated version of the image data set in which the modelled artefact is counteracted and provision of a further focus criterion for this version, d) variation of the modelled artefact and repetition of the preceding function iteratively to produce a manipulated version of the image data set compensated for a version of the modelled artefact associated with optimisation of the focus criterion to the extent obtainable by iteration, and e) production of corrected image data from the manipulated version of the image data set associated with optimisation of the focus criterion, wherein the scanning means is an MRI scanning means (12), characterised in that the modelled artefact is associated with object motion, the MRI scanning means (12) is arranged to use a sub-set of the data set to obtain a sub-image, the processing means (38) is arranged to perform iterative variation of the modelled artefact over a region corresponding to the sub-set and to extend the sub-set later in the iteration function.

* * * * *